G. E. VIERLING.
COFFEE PERCOLATOR.
APPLICATION FILED FEB. 8, 1916.
1,302,483.
Patented Apr. 29, 1919.
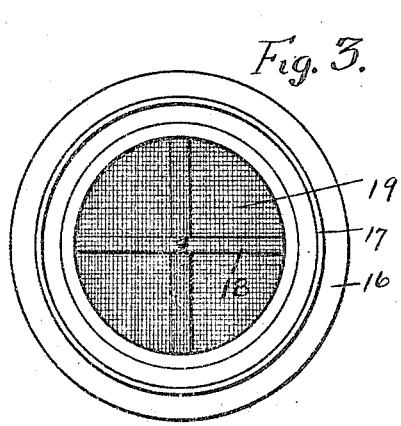
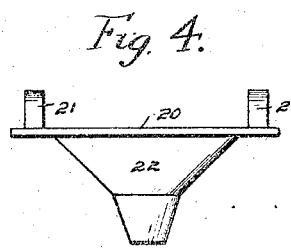
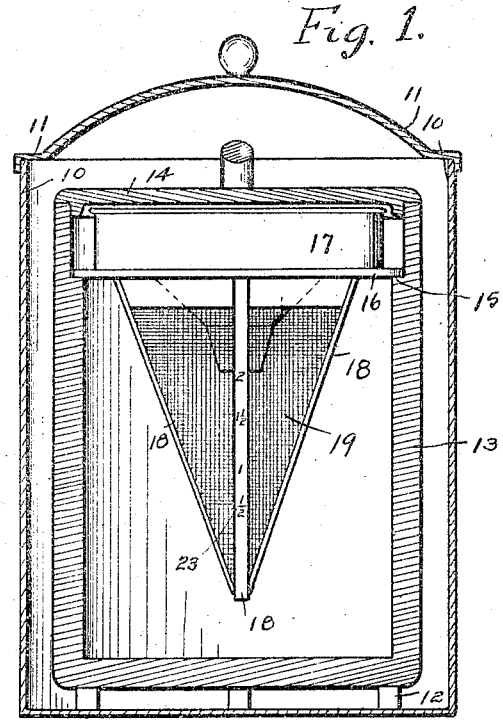
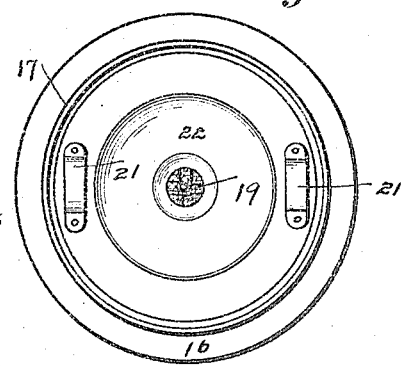

UNITED STATES PATENT OFFICE.

GEORGE E. VIERLING, OF DES MOINES, IOWA.

COFFEE-PERCOLATOR.

1,302,483.     Specification of Letters Patent.     Patented Apr. 29, 1919.

Application filed February 8, 1916. Serial No. 76,904.

*To all whom it may concern:*

Be it known that I, GEORGE E. VIERLING, a citizen of the United States, and resident of Des Moines, in the county of Polk and State of Iowa, have invented a certain new and useful Coffee-Percolator, of which the following is a specification.

The object of my invention is to provide a coffee percolator of simple, durable and inexpensive construction.

A further object is to provide a coffee percolator adapted to be made in such size and of such capacity as to be convenient for use in cafés, hotels, and the like, where coffee is made in large quantities, whereby the coffee can be made by pouring hot water through the ground coffee in such a way that all of the coffee is subjected to the passing water to substantially the same extent.

A further object is to provide such a coffee percolator having a coffee receptacle, and having means for indicating the amount of coffee in the receptacle.

Still a further object is to provide such a receptacle adapted to hold coffee and permit water to pass through readily, and of such shape as to cause all of the coffee to be subjected to the water in about the same way, and also properly reinforced.

A further object is to provide in such a device detachable means for reinforcing the coffee receptacle for cleaning.

My invention consists in the construction, arrangement and combination of the various parts of the device, whereby the objects contemplated are attained, as hereinafter more fully set forth, pointed out in my claim, and illustrated in the accompanying drawings in which:

Figure 1 shows a vertical, central, sectional view through a coffee percolator, embodying my invention.

Fig. 2 shows a top or plan view of the inner jar with the cover removed.

Fig. 3 shows a view similar to Fig. 2, with the water funnel removed.

Fig. 4 shows a side elevation of the water funnel.

In the accompanying drawings, I have used the reference numeral 10 to indicate generally the outer receptacle having a removable cover 11. Spaced from the receptacle at all points on the interior thereof, and resting upon suitable supporting members 12 is a receptacle 13, which may be a masonry jar or the like of suitable kind to hold what for convenience of description I may call brewed coffee.

The part 13 has a cover 14 which is readily removable. The part 13 is provided on its interior below its upper edge with an annular shoulder 15.

I provide a receptacle for the ground coffee grains, which for convenience of description and for distinguishing it from the liquid or brewed coffee, I will call simply coffee, comprising a flat annular rim 16 adapted to rest on the shoulder 15.

Extending upwardly from the rim 16 is a vertical annular rim 17, forming a wall. Secured to the rim 15 are pairs of downwardly inclined supporting strips 18, which are inclined toward each other at their lower ends. The members of each pair of strips 18 are connected at their lower ends. I preferably provide two pairs of said strips, but more may be employed if desired.

Supported within the strips 18 below the rim 16 is a coffee receiving member 19, which may be made of brass strainer cloth or perforated members of tin, or other suitable material adapted to hold the ground coffee and permit the free passage of water. The coffee receiving member 19 has the form of an inverted cone and is received within and supported by the members 18, and is preferably secured thereto.

The wall 17 is preferably spaced outwardly from the inner edge of the rim 16 and inwardly from the outer edge thereof.

For pouring hot coffee into the member 19, I provide a device comprising an annular rim 20 designed to rest on the rim 16 within the wall 17 having suitable handles 21, whereby it may be removed.

Secured to the inner edge of the rim 20 and extending downwardly therefrom is a funnel 22. On one or more of the strips 18 are indicating characters 23 for indicating the quantity of coffee received within the member 19.

In the practical use of my improved coffee percolator, the covers 11 and 14 and the funnel 22 are removed. The required amount of ground coffee is poured into the receptacle member 19 the amount being, indicated by the character 23.

The funnel 20 is then placed in position and a certain measured amount of water is poured into the receptacle formed by the walls 17. The covers are then replaced and the water, which is poured as hot as possible, runs downwardly through the funnel into the receptacle 19 and through the coffee.

I have found that with a receptacle 19 of this shape and with the water fed thereto through the central funnel, the coffee is whirled around forming a layer against the walls of the receptacle 19 with a hollow central opening in its upper portion. Thus all of the coffee is subjected in about the same degree to the action of the hot water. The water gradually percolates downwardly through the coffee and may be drawn off through the receptacle 13 by an ordinary cock or the like.

The comparatively thin receptacle 19 is supported by the strips 18.

The coffee is more thoroughly subjected to the action of the water when the water is poured downwardly through the funnel, than is the case where a bag is simply partially immersed in hot water, and I find that the flavor can be more accurately obtained and maintained with a bag of this kind, than with a bag immersed or partly immersed in water.

The device is easily used, and the coffee holding member 19 may be cleaned easily and quickly.

More coffee can be made by simply emptying the used grounds from the member 19 and replacing a predetermined amount of coffee therein, and supplying more hot water.

My device is cleaner and more sanitary than the use of sacks for the coffee.

Where an ordinary urn is used, with coffee in a sack, it is necessary when supplying water to the urn to open the top and let the coffee flavor into the room, thereby also losing the flavor from the coffee. With my percolator very little flavor can escape through the funnel and as soon as any water is poured into the funnel any further loss of the flavor and of steam is prevented. My device secures almost the full benefit of the boiling water, which is very hard to do with ordinary urns. In restaurants the cost of sacks is a considerable item which is saved by my device.

Some changes may be made in the construction and arrangement of the various parts of my device without departing from its essential features and purposes, and it is my intention to cover by this application any such changes which may be included within the scope of my claim.

I claim as my invention.

In a device of the class described, a receptacle having a detachable cover thereon adapted to form a substantially liquid tight joint therewith, an annular horizontal inwardly extending shoulder adjacent to the upper edge of said receptacle, an annular collar adapted to rest upon said shoulder, a reticulated conical receptacle supported from said collar at its larger end and having its smaller end disposed adjacent to the bottom of said first receptacle, an annular upwardly extending collar fixed to said first collar and a funnel having its receiving end detachably supported upon said last described collar and having its discharge end disposed intermediate of the top and bottom and sides of said reticulated receptacle whereby liquid poured into said funnel will be discharged on any granulated material, which may be in reticulated receptacle at the central point of the upper surface of such material.

Des Moines, Iowa, January 24, 1916.

GEORGE E. VIERLING.

Copies of this patent may be obtained for five cents each, by addressing the "Commissioner of Patents, Washington, D. C."